United States Patent [19]

Brouillette et al.

[11] Patent Number: 4,518,734

[45] Date of Patent: May 21, 1985

[54] WATER BASED AEROSOL COATINGS

[75] Inventors: Bruce R. Brouillette, Sauk Village; Martha J. Shafer, Chicago, both of Ill.

[73] Assignee: Rust-Oleum Corporation, Vernon Hills, Ill.

[21] Appl. No.: 275,929

[22] Filed: Jun. 22, 1981

[51] Int. Cl.$^3$ .......................... C09D 5/02; C09D 3/64; C08K 5/06

[52] U.S. Cl. .................................................. 524/378

[58] Field of Search ........... 260/22 A, 29.2 E, 33.2 R; 524/378, 608, 903

[56] References Cited

U.S. PATENT DOCUMENTS

| | | | |
|---|---|---|---|
| 3,223,659 | 12/1965 | Curtice et al. | 260/22 T |
| 3,984,364 | 10/1976 | Taub | 260/22 R |
| 4,124,555 | 11/1978 | Gross et al. | 260/33.2 R |
| 4,125,499 | 11/1978 | Howard | 260/22 T |
| 4,230,609 | 10/1980 | Burroway et al. | 260/33.2 R |
| 4,240,940 | 12/1980 | Vasishth et al. | 260/22 R |
| 4,265,797 | 5/1981 | Suk | 524/903 |

FOREIGN PATENT DOCUMENTS 880272 3/1980 Belgium .

OTHER PUBLICATIONS

Aerosol Age, "Dimethylether Pure, A Review", L. J. Bohnenn, Jan. 1981, pp. 26–30 and Feb. 1981, pp. 42–47.

Primary Examiner—Ronald W. Griffin
Attorney, Agent, or Firm—Michael T. Murphy

[57] ABSTRACT

Water based aerosol coatings which comprise water reducible resin, dimethylether, water and water soluble solvent are described. The improved water reducible aerosol coatings can be cleaned up with water, have high gloss, are non-flammable and contain no aromatic hydrocarbons such as toluene or xylene.

5 Claims, No Drawings

WATER BASED AEROSOL COATINGS

BACKGROUND OF THE INVENTION

The present invention relates to improved water containing aerosol coatings.

There are several prior publications which disclose water reducible coatings, and some in particular which describe water reducible aerosol coatings. Although water reducible aerosol coatings have been taught, the inclusion of large amounts of water in water reducible aerosol coating formulations containing water soluble resins has been contraindicated.

Belgium Pat. No. 880272 to The Conn Chem Group, Limited, discloses a water reducible aerosol paint which includes an "insoluble" film forming acrylic polymer and a "sufficient amount of a surfactant to keep the solids in suspension in the liquid phase." The present invention utilizes water soluble resins and therefore does not require the use of surfactants. Unlike the resin emulsion of the Conn Chem invention, the resin in the present invention is uniformly dispersed as a single phase throughout the solvent in essentially molecular dimensions. This results in coatings having higher gloss.

U.S. Pat. No. 4,125,499 to Jerold D. Howard describes a water-receptive paint which contains a maximum of 8 weight percent water. Howard teaches, in part, "It is preferable to eliminate entirely the presence of water, as it performs no useful function in the formulation, but represents some source of can corrosion and instability." (see column 3, lines 41-44). In the present invention water comprises a substantial part of the coating's solvent phase. Can corrosion is substantially reduced by using commercially available lined cans and by adjusting the pH of the formulation to greater than 8. The stability of the present coatings is dependent upon the resin utilized, and is comparable to currently available water based brush-on paints made with similar resins.

The present invention provides a water reducible aerosol coating which comprises a single phase liquid system and utilizes water as a cosolvent. There is no need to use defoamers or surfactants which contribute to water sensitivity of the resultant film; in fact, the presence of defoamers in the present invention may cause foaming. The present coatings are environmentally safe, non-flammable and may be cleaned up with water.

SUMMARY OF INVENTION

The present invention provides aerosol coating compositions comprising water reducible resin, dimethylether, water and water soluble solvent. The dimethylether, which is water soluble, serves as a propellant and also as a cosolvent. The use of dimethylether as a propellant/cosolvent overcomes the foaming problems encountered with other aerosol coatings containing water. It also overcomes any need for aromatic hydrocarbons or halogenated hydrocarbons in the formulations as described by Bernard Taub in U.S. Pat. No. 3,984,364.

DETAILED DESCRIPTION OF INVENTION

Dimethylether is a known aerosol propellant which has been used in water-based aerosol products such as hairsprays, perfumes, air fresheners, insecticides, spray starches and spray polishes, but not until the present invention, has it been successfully used in water-based aerosol paints. In U.S. Pat. No. 4,125,499 Howard teaches that dimethylether can be used as a propellant for his invention (column 5, lines 53 and 54), but also indicates that the useful range of water in his invention is 0-8%. Even beyond 5% there is some foaming (column 7, line 6-8).

Although Aerosol Age, "Dimethylether Pure, A Review", L. J. Bohnenn, January 1981, pages 26-30 and February 1981, pages 42-47, teaches the use of dimethylether as an aerosol propellant, the author teaches away from its use in aqueous-based paints. The author states, in part, "We have taken the line that only non-fluorocarbons and 'non-shake before using' formulations are of interest." (see page 44, column 3, lines 4-7). Paints require shaking before use due to the presence of settled pigments. Just below the author's statement on page 44 is a chart which shows that dimethylether is recommended as a propellant for "non-aqueous" paints. Surprisingly, it has been found in the present invention that dimethylether may be used as a propellant for water-based paints containing up to 70% by weight water, wherein the dimethylether uniquely contributes to foam-free continuous film formation.

Coating compositions of the present invention comprise ingredients stated in percentage by weight of the following ranges:

| water soluble resins | 5.0–60.0 |
| water soluble solvent | 0.5–80.0 |
| water | 10.0–70.0 |
| dimethylether | 5.0–50.0 |

In addition to the above ingredients, a number of additional components may be added to the basic ingredients in order to obtain particularly desired coatings. Additional components comprise pigments, driers, small amounts of non-water soluble solvents, ammonia hydroxide (or similar basic solution) for pH adjustment and resin neutralization, and other water soluble propellants such as nitrous oxide and carbon dioxide.

Resins applicable for this invention consist of those generic resins rendered water soluble by neutralization of acidic or basic sites thereon which render said resin dispersible in molecular or near molecular dimensions, resulting in a single liquid phase. Examples of such resins are the anionic or cationic water soluble oil-free or oil modified alkyds, acrylics, styrene acrylics, urethanes, polyesters, silicone polymers and epoxies. Water soluble resins are commercially available through several different suppliers and typically contain approximately 25% water soluble solvent.

Water soluble solvents include water soluble alcohols, ketones, acetates and glycol ethers. Specific examples include ethanol, isopropanol, n-propanol, n-butanol, acetone, diethylketone, dimethylformamide, 2-nitropropane, ethylene glycol monomethyl ether, ethylene glycol monoethyl ether, ethylene glycol monobutyl ether, propylene glycol methyl ether, and ethylene glycol monomethyl ether acetate. The glycol ethers are preferred solvents for many formulations of the present invention.

The choice of pigments depends upon the characteristics and color of the desired coating. Any pigments commonly used in paint compositions can be employed in the composition of the present invention. Examples of useful pigments include titanium dioxide, carbon black, phthalocyanines, molybdates, perlenes, flavanthrones, quinacridones, iron oxide, and other known paint pigments.

Commercially available driers such as cobalt naphthenate, manganese carboxylate, zirconium carboxylate, calcium carboxylate and cobalt carboxylate may be added to accelerate oxidation of the coating for rapid drying after being sprayed. The driers are typically in solutions containing insoluble solvents such as mineral spirits. These solvents are tolerated by the coating of the present invention.

Although it is necessary for dimethylether to be present in the formulations of the present invention in order to obtain coatings having the desired characteristics described above, additional propellants such as nitrous oxide and carbon dioxide may be added to replace some of the dimethylether as a cost-saving technique.

The present invention is illustrated by the following examples which provide typical formulations that can be manufactured by normal paint manufacturing techniques and packaged in aerosol containers. These formulations are non-flammable and may be cleaned up with water before becoming dry. The examples are meant to further illustrate the products of the present invention and are in no way intended to limit the scope of this invention.

EXAMPLE 1

| WATER REDUCIBLE GLOSS WHITE AEROSOL | |
|---|---|
| Ingredient | % Weight |
| Chempol 10-0079 (Freeman Chemical, resin, water reducible oxidizing isophthalic alkyd). | 20.31 |
| Cobalt Hydrocure (Mooney Chemical, drier cobalt naphthenate 45%, dispersible complexing agent 10%, mineral spirits 45%). | 0.21 |
| Manganese Hydrocure (Mooney Chemical, drier manganese carboxylate 42%, dispersible complexing agent 10%, mineral spirits 48%). | 0.21 |
| Titanium dioxide | 12.03 |
| Ethylene glycol monobutyl ether | 8.02 |
| Ammonium hydroxide 28% | 0.70 |
| Deionized water | 23.52 |
| Dimethylether | 35.00 |

EXAMPLE 2

| WATER REDUCIBLE GLOSS WHITE AEROSOL | |
|---|---|
| Ingredient | % Weight |
| Cargill 7441 (Cargill Inc., water reducible alkyd) | 17.34 |
| AMP-95 (IMC Corp., Amine for adjusting pH and neutralizing resin) | 1.00 |
| Titanium dioxide | 12.97 |
| Aerosil R-972 (DeGussa Chemical, silica) | 0.63 |
| Cobalt Hydrocure II (Mooney Chem.) | 0.20 |
| Calcium Hydrocem (Mooney Chem.) | 0.26 |
| Zirconium Hydrocem (Mooney Chem.) | 0.11 |
| Ethylene glycol monobutyl ether | 0.88 |
| Deionized water | 36.61 |
| Dimethylether | 30.00 |

EXAMPLE 3

| WATER REDUCIBLE GLOSS BLACK AEROSOL | |
|---|---|
| Ingredient | % Weight |
| Cargill 7441 | 18.92 |
| AMP-95 | 0.93 |
| 410 Raven Black Powder (Columbian Chemicals Company black pigment) | 1.46 |
| Aerosil R-972 | 0.29 |
| Cobalt Hydrocure II | 0.23 |
| Calcium Hydrocem | 0.29 |
| Zirconium Hydrocem | 0.14 |
| Ethylene glycol monobutyl ether | 0.58 |
| Deionized Water | 47.16 |
| Dimethylether | 30.00 |

EXAMPLE 4

| WATER REDUCIBLE RED IRON OXIDE PRIMER AEROSOL | |
|---|---|
| Ingredient | % Weight |
| Kelsol 3905 (Spencer Kellog, water reducible alkyd) | 17.25 |
| AMP-95 | 0.68 |
| Zinc phosphate | 2.28 |
| Al-sil-ate (Freeport Kaolin, aluminum silicate) | 8.60 |
| Red Iron Oxide | 4.25 |
| Aerosil R-972 | 0.62 |
| Cobalt Hydrocure II | 0.21 |
| Calcium Hydrocem | 0.26 |
| Zirconium Hydrocem | 0.11 |
| Ethylene glycol monobutyl ether | 1.42 |
| Deionized water | 34.32 |
| Dimethylether | 30.00 |

We claim:

1. A water containing aerosol coating containing the following ingredients in the percentage by weight amounts indicated:

| a. water soluble resin | 10.0–30.0 |
|---|---|
| b. water soluble solvent | 0.5–20.0 |
| c. water | 20.0–60.0 |
| d. dimethylether | 20.0–40.0. |

2. An improved aerosol coating of claim 1 wherein the coating includes pigment therein.

3. An improved aerosol coating of claim 1 wherein the coating includes a drying agent therein.

4. An improved aerosol coating of claim 1 wherein the water soluble resin is an alkyd resin.

5. An improved aerosol coating containing the following ingredients in the percentage by weight amounts indicated:

| a. Water soluble resin | 10.0–30.0 |
|---|---|
| b. water soluble solvent | 0.5–20.0 |
| c. water | 20.0–60.0 |
| d. dimethylether | 20.0–40.0 |
| e. pigment | 0.0–20.0 |
| f. drying agent | 0.05–2.0 |
| g. basic solution for pH adjustment | 0.0–2.0. |

* * * * *